Sept. 5, 1933.  H. JESSELL  1,925,486

ANTISLIPPING SPIKE FOR SHOE SOLES

Filed Sept. 7, 1932

Inventor
Harry Jessell
By Clarence A. O'Brien
Attorney

Patented Sept. 5, 1933

1,925,486

UNITED STATES PATENT OFFICE 1,925,486

ANTISLIPPING SPIKE FOR SHOE SOLES

Harry Jessell, Tacoma, Wash.

Application September 7, 1932. Serial No. 632,039

1 Claim. (Cl. 36—59)

This invention relates to anti-slipping devices for shoes, particularly the variety including rubber and composite soles, and it has more specific reference to a device of this general classification such as is referred to as a spike, stud, calk, or the like.

The invention is especially designed for use in connection with rubber soled golf and sport shoes, and shoes of the style and type worn by lumbermen and the like.

I am aware of the fact that the prior art to which the invention relates embodies many different kinds of calks and spikes, and in perfecting the present device constituting the novelty of this application, I have adopted a structurally different and improved device for the aforesaid purposes.

The improved device embodies two essential parts one of which is permanently embedded in the rubber sole at the time it is molded, and the other one of which is standardized and detachably connected with the first named part in the manner to render it renewable and interchangeable.

Other features and advantages of the invention will become more readily apparent from the following description and drawing.

Figure 1:
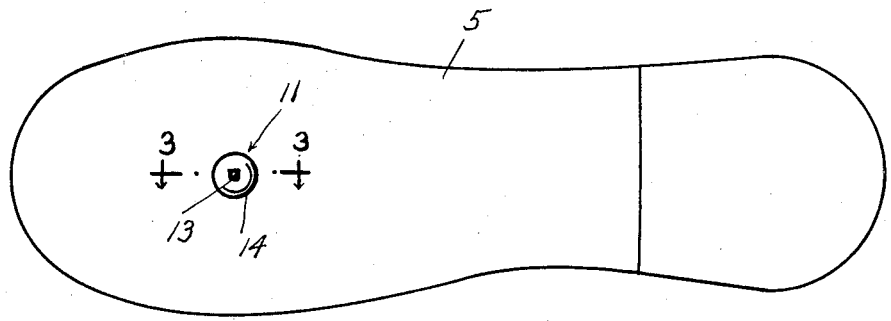
Figure 1 is a bottom plan view of a conventional shoe sole equipped with the invention.
Figure 2:
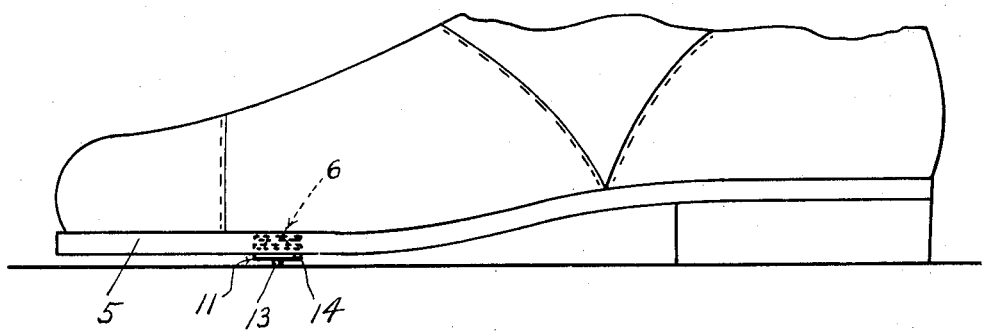
Figure 2 is a side view of Figure 1.
Figure 3:
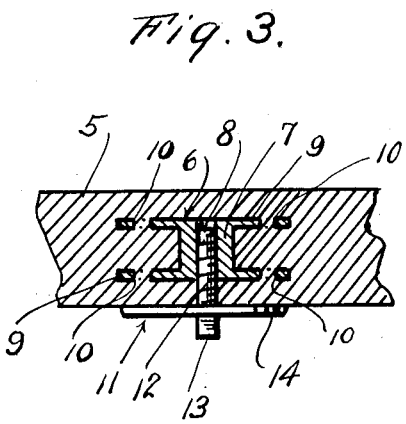
Figure 3 is an enlarged fragmentary detail section taken approximately on the plane of the line 3—3 of Figure 1.
Figure 4:
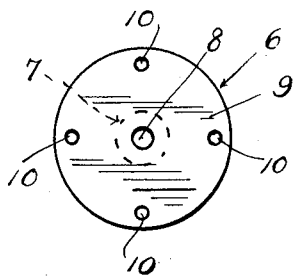
Figure 4 is a plan view of the permanently anchored nut.

In the drawing, the shoe sole is distinguished by the numeral 5 and, as before stated, the anchoring unit 6 is permanently embedded therein as shown in Figure 3. This unit 6 comprises a nut 7 having a centralized screw threaded bore 8 open at its opposite ends, together with a pair of duplicate anchoring flanges 9. These flanges are disposed in spaced parallelism and provided with marginal apertures 10 into which the rubber flows when in a plastic state, after which it hardens and maintains the nut securely embedded in the intermediate portion of the rubber sole as depicted in Figure 3.

The stud or spike unit is distinguished by the numeral 11 and comprises a screw-threaded stem 12 which is threaded into the nut, a pointed anti-slipping calk or spike 13, and an abutment disk 14 which abuts the bottom of the sole.

Particular attention is drawn to the fact that the circular flanges with which the nut is provided have properly arranged apertures formed therein so that when the nut or anchor is vulcanized into the rubber, the rubber seeps through the holes and serves to securely embed the nut in the sole. Obviously, an anchor unit of this type is applicable only to rubber or equivalent soles and is susceptible of placement only at the time of manufacture. Moreover, when thus secured in place the nut, together with the stud forms a satisfactory and waterproof assembly. This is distinguishable from the driven type of calks or cleats such as is generally usable in connection with leather soles.

By using a double arrangement of flanges, the nut is properly balanced and uniformly and firmly anchored, whereupon, when the stem is threaded into the nut, a rigid and dependable ensemble is assured.

It is thought that persons skilled in the art to which the invention relates will be able to obtain a clear understanding of the invention after considering the description in connection with the drawing. Therefore, a more lengthy description is regarded as unnecessary.

Minor changes in shape, size, and rearrangement of details coming within the field of invention claimed may be resorted to in actual practice, if desired.

I claim:

As a new article of manufacture, a rubber sole, a nut permanently and entirely embedded in said sole and having an open-ended screw-threaded bore, and a pair of spaced parallel integral disk-like flanges, said flanges being apertured, and an anti-slipping unit comprising an abutment disk bearing directly against the tread of the sole, a stud extending outwardly beyond the disk, and a screw-threaded stem carried by the disk and threaded into said nut, the diameter of said abutment disk being substantially greater than the diameter of said stud.

HARRY JESSELL.